(12) United States Patent
Courtois et al.

(10) Patent No.: US 9,181,136 B2
(45) Date of Patent: Nov. 10, 2015

(54) METHOD FOR PRODUCING HOLLOW BODIES HAVING ENCLOSED FREELY DISPLACEABLE PARTICLES

(75) Inventors: Julien Courtois, Ludwigshafen (DE); Carsten Schips, Speyer (DE); Petra Lutz-Kahler, Weiterstadt (DE); Willi Riegel, Waghäusel (DE); Mohammed Abboud, Darmstadt (DE)

(73) Assignee: BASF SE, Ludwigshafen (DE)

( * ) Notice: Subject to any disclaimer, the term of this patent is extended or adjusted under 35 U.S.C. 154(b) by 490 days.

(21) Appl. No.: 13/522,835

(22) PCT Filed: Jan. 19, 2011

(86) PCT No.: PCT/EP2011/050638
§ 371 (c)(1),
(2), (4) Date: Jul. 18, 2012

(87) PCT Pub. No.: WO2011/089130
PCT Pub. Date: Jul. 28, 2011

(65) Prior Publication Data
US 2012/0295026 A1    Nov. 22, 2012

Related U.S. Application Data

(60) Provisional application No. 61/296,067, filed on Jan. 19, 2010.

(30) Foreign Application Priority Data

Jan. 19, 2010   (EP) ..................................... 10151107

(51) Int. Cl.
*B01J 13/20*       (2006.01)
*C04B 38/06*     (2006.01)
(Continued)

(52) U.S. Cl.
CPC ............. *C04B 35/624* (2013.01); *C04B 35/111* (2013.01); *C04B 35/14* (2013.01);
(Continued)

(58) Field of Classification Search
CPC ...... A61K 8/0279; A61K 9/2081; C08L 5/04; B01J 35/08; B01J 35/1061; B01J 37/0248;
B01J 13/0091; B01J 13/043; B82Y 30/00; A61L 2400/12; A61L 17/145; A61L 2300/606; A61L 2300/622; A61L 2300/624
USPC ................................ 424/493, 497, 450, 451; 428/402–402.24, 407, 403, 314, 423.1, 428/474.4; 427/6, 389.9, 213.3–213.36; 264/45.3, 48, 53, 41, 4–4.7; 521/57, 521/56, 76, 142; 423/338
See application file for complete search history.

(56) References Cited

U.S. PATENT DOCUMENTS 4,670,303 A * 6/1987 Miles ........................ 427/213.31
4,917,857 A * 4/1990 Jaeckel et al. ..................... 419/9
(Continued)

FOREIGN PATENT DOCUMENTS

DE          2342948 A1    3/1975
DE    102004003507 A1    8/2005
(Continued)

OTHER PUBLICATIONS

International Search Report for PCT/EP2011/050638 mailed Aug. 18, 2011.
(Continued)

*Primary Examiner* — James J Seidleck
*Assistant Examiner* — S. Camilla Pourbohloul
(74) *Attorney, Agent, or Firm* — Drinker Biddle & Reath LLP

(57) ABSTRACT

The invention relates to a method for producing hollow bodies having freely displaceable particles enclosed in the hollow body, wherein a) a gel-forming liquid in which the particles are suspended is brought into a cross-linking bath, b) the gel cores that form are isolated, c) the cores are coated with a composition comprising sinterable material and a binder, and d) the coated cores are subjected to a heat treatment wherein the gel and the binder are expunged and the sinterable material is sintered into a closed shell. The gel forming material is, for example, sodium alginate, and the cross-linking bath comprises calcium ions. The particles are selected, for example, from $ZrO_2$, $Al_2O_3$, $TiO_2$, and $SiO_2$ or mixtures thereof. The sinterable material is, for example, a metal powder such as carbonyl iron powder.

11 Claims, 1 Drawing Sheet

(51) Int. Cl.
  C04B 35/624    (2006.01)
  C04B 35/111    (2006.01)
  C04B 35/14     (2006.01)
  C04B 35/46     (2006.01)
  C04B 35/48     (2006.01)
  C04B 35/565    (2006.01)
  C04B 35/58     (2006.01)
  C04B 35/628    (2006.01)
  C04B 35/634    (2006.01)
  C04B 38/00     (2006.01)
  C04B 111/40    (2006.01)

(52) U.S. Cl.
  CPC ............... *C04B 35/46* (2013.01); *C04B 35/48* (2013.01); *C04B 35/565* (2013.01); *C04B 35/58* (2013.01); *C04B 35/58085* (2013.01); *C04B 35/628* (2013.01); *C04B 35/634* (2013.01); *C04B 38/009* (2013.01); *C04B 2111/40* (2013.01)

(56) References Cited

U.S. PATENT DOCUMENTS

| | | | |
|---|---|---|---|
| 7,297,405 B2* | 11/2007 | Kohno | 428/403 |
| 2004/0191366 A1* | 9/2004 | Mangos et al. | 426/89 |
| 2010/0310853 A1 | 12/2010 | Schwiegk et al. | |
| 2011/0008608 A1 | 1/2011 | Bellin et al. | |
| 2011/0065819 A1 | 3/2011 | Schips et al. | |
| 2011/0268972 A1 | 11/2011 | Schips et al. | |
| 2011/0269858 A1 | 11/2011 | Schips et al. | |
| 2011/0294968 A1 | 12/2011 | Abboud et al. | |
| 2011/0316198 A1 | 12/2011 | Schips et al. | |

FOREIGN PATENT DOCUMENTS

| | | |
|---|---|---|
| EP | 0300543 A1 | 1/1989 |
| EP | 1329438 A1 | 7/2003 |
| EP | 1359131 A1 | 11/2003 |
| EP | 1557819 A1 | 7/2005 |
| EP | 09157551.4 | 4/2009 |
| JP | 2001240479 A | 9/2001 |

OTHER PUBLICATIONS

Lu, Y., et al. Preparation and Characterization of Micrometer-Sized "Egg Shells" Advanced Materials (Feb. 19, 2001) 13, No. 4, pp. 271-274.

* cited by examiner

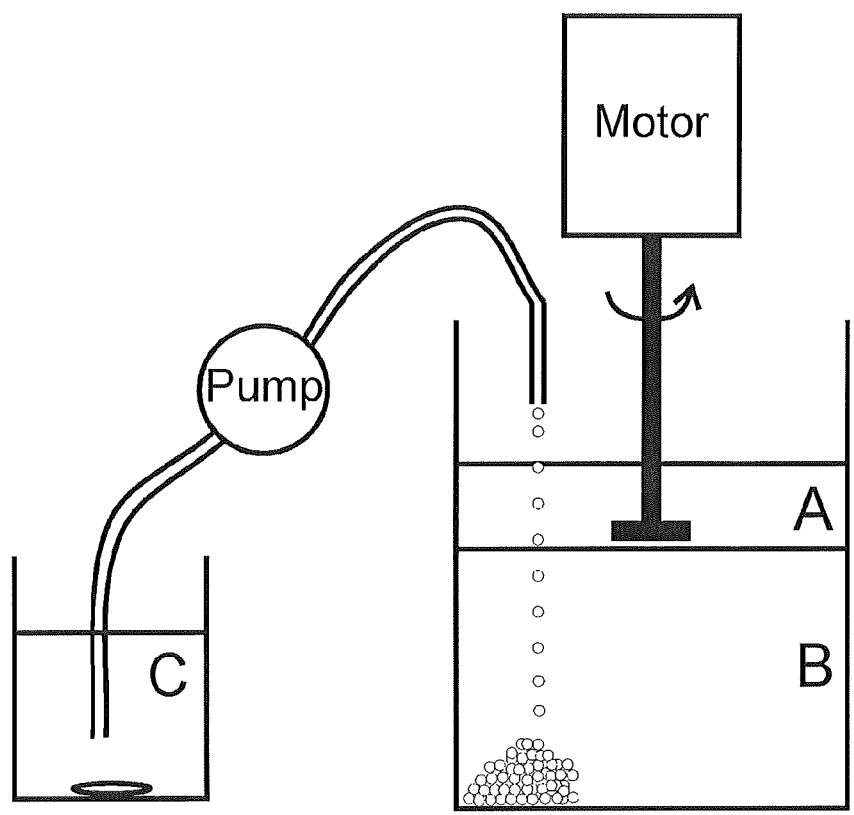

METHOD FOR PRODUCING HOLLOW BODIES HAVING ENCLOSED FREELY DISPLACEABLE PARTICLES

RELATED APPLICATIONS

This application is a national stage application (under 35 U.S.C. §371) of PCT/EP2011/050638, filed Jan. 19, 2011, which claims benefit of U.S. Provisional Application No. 61/296,067, filed Jan. 19, 2010, and European Patent Application No. 10151107.9, filed Jan. 19, 2010.

The invention relates to a method for producing hollow bodies having freely displaceable particles enclosed in the hollow body.

According to DE 10 2004 003507, hollow bodies having enclosed, freely mobile particles serve as sound-absorbing structures, in particular for applications in which structure-borne noise occurs and requires damping. In the production process described in DE 10 2004 003507 and illustrated by examples, a coating composed of at least two superposed individual layers is applied to a core composed of an organic material. Here, the layer applied directly to the surface of the core comprises solid particles of a material which are formed by a material having a sintering temperature higher than that of particles of a material present in a further applied layer. The coating operation is followed by a heat treatment in which the organic constituents are firstly pyrolyzed, the pulverulent particles of the layer which is formed first directly on the core are released and the pulverulent particles of the outer layer are sintered to form a shell. The hollow structural elements are used as a loose bed or are joined to one another by adhesion after sintering by means of adhesive bonding, soldering or sintering to form shaped bodies.

DE-A 2342948 discloses a process for producing hollow bodies which comprise a shell of a ceramic material enclosing a hollow space. Here, shaped bodies made of an organic material which is combustible or can be decomposed by heating are provided with a coating of a powder of an unfired ceramic material and a binder and the coated shaped bodies are then heated to from 200 to 2000° C. so that the organic material burns or decomposes, the binder burns or decomposes or is converted into a ceramic compound of its own and the ceramic material sinters.

EP-A 300 543 describes a process for producing hollow metallic or ceramic spheres by applying a layer of solid to a substantially spherical particle of foamed polymer and pyrolyzing the coated polymer core. The particles of foamed polymer, preferably expanded polystyrene, are treated while being kept in motion with an aqueous suspension comprising dissolved or suspended binder and metallic and/or ceramic powder particles. The coated and dried particles are pyrolyzed while being kept in motion at from 400 to 500° C. and sintered while being kept in motion at temperatures of from 900 to 1500° C.

The earlier application EP 09157551.4 describes a process for producing hollow bodies having freely mobile particles enclosed in the hollow body, in which cores of substantially closed-cell polymer foam particles in which particles are dispersed are coated with a composition comprising a sinterable material and a binder and the coated cores are subjected to a heat treatment in which the polymer and the binder are driven off and the sinterable material sinters to form a closed shell.

It is an object of the invention to provide a process for producing hollow bodies having enclosed, freely mobile particles, which process allows the advantageous production of hollow bodies having high degrees of fill.

The object is achieved by a process for producing hollow bodies having freely mobile particles enclosed in the hollow body, wherein
a) particles are suspended in a gel-forming liquid and the gel-forming liquid is introduced into a crosslinking bath,
b) the gel cores which form are isolated,
c) the cores are coated with a composition comprising a sinterable material and a binder and
d) the coated cores are subjected to a heat treatment in which the gel and the binder are driven off and the sinterable material sinters to form a closed shell.

A BRIEF DESCRIPTION OF THE FIGURE

FIG. 1 illustrates an apparatus suitable for producing the cores used according to the invention.

The gel-forming liquid is preferably an aqueous gel-forming liquid. It comprises a gel former which on contact with a crosslinker crosslinks to form a gel.

The gel-forming liquid with the particles dispersed therein is added dropwise via a nozzle, e.g. with the aid of a pump, to the crosslinking bath. The crosslinking bath is preferably an aqueous crosslinking bath. It comprises a crosslinker which on contact with the gel former comprised in the gel-forming liquid crosslinks to form a gel which stabilizes the shape of the droplets of gel-forming liquid introduced into the crosslinking bath and encapsulates the particles dispersed therein.

The gel cores obtained in this way are isolated, e.g. filtered off and dried. They can be classified according to size by sieving. The gel cores serve as template for the production of filled hollow bodies. For this purpose, the cores are coated with a composition comprising a sinterable material and a binder and the coated cores are subjected to a heat treatment in which the gel and the binder are driven off and the sinterable material sinters to form a closed shell. Here, the particles dispersed in the gel are also released and are present in freely mobile form in the finished hollow body.

The gel former can be, for example, an ionically crosslinking gel former or a covalently crosslinking gel former.

Suitable covalently crosslinking gel formers are, for example, polyacrylamides or polyurethanes which can be crosslinked by means of polyaldehydes, polyepoxides or the like.

Ionically crosslinking gel formers are preferred. Possible ionically crosslinking gel formers are alginates, carrageenans, chitosans and pectinates. Crosslinkers employed are metal ions, in particular polyvalent metal ions such as calcium and/or magnesium ions.

The concentration of the gel former in the gel-forming liquid is chosen so as to be sufficiently high for crosslinking to occur at a sufficient rate and the gel cores obtained to have sufficient stability. However, the viscosity of the gel-forming liquid increases with the concentration of the gel former in the gel-forming liquid. The higher the viscosity of the gel-forming liquid, the more difficult it is to obtain small droplets and thus small gel cores. The concentration of the crosslinker in the crosslinking bath is chosen so as to be sufficiently high for crosslinking to occur at a sufficient rate. A person skilled in the art can easily determine suitable concentrations taking into account the abovementioned factors.

In a preferred embodiment, the ionically crosslinking gel former is sodium alginate; the crosslinking bath comprises calcium ions, e.g. in the form of calcium chloride. The sodium alginate concentration in the gel-forming liquid is preferably from 0.1 to 5% by weight, in particular from 0.5 to 2% by weight. The calcium chloride concentration in the crosslinking bath is preferably from 0.05 to 20% by weight, in particular from 0.5 to 5% by weight.

The cores are preferably substantially spherical. The cores generally have a diameter (or a length in the direction of the largest dimension in the case of nonspherical cores) of from 0.1 to 20 mm, in particular from 1 to 3 mm.

When the droplets of the gel-forming liquid with the particles dispersed therein impinge on the surface of the crosslinking bath, the droplets can be deformed as a result of the surface tension of the crosslinking bath, so that the shape of the gel cores obtained deviates more or less from the ideal spherical shape.

Preference is therefore given to an embodiment of the process of the invention in which
- a1) a layer of a liquid phase which is miscible neither with the crosslinking bath nor with the gel-forming liquid is placed on top of the crosslinking bath,
- a2) the gel-forming liquid with the particles dispersed therein is introduced into the liquid phase and
- a3) droplets of the gel-forming liquid are allowed to sink from the liquid phase into the crosslinking bath.

During passage through the liquid phase, during which crosslinking does not yet occur, the droplets of the gel-forming liquid with the particles dispersed therein can regain their ideal spherical shape. They then sink from the liquid phase into the crosslinking bath where gel formation occurs as a result of crosslinking and the spherical shape is stabilized.

Suitable liquid phases are, in particular, solvents which are immiscible with water and have a density lower than that of water, e.g. aliphatic hydrocarbons such as hexane, cyclohexane, methylcyclohexane; or aromatic hydrocarbons such as benzene, toluene, xylene and the like.

In general, the gel-forming liquid comprises from 10 to 90% by weight of dispersed particles, in particular from 30 to 60% by weight of dispersed particles, based on the total weight of the gel-forming liquid and the particles.

The density of the dispersed particles used according to the invention is generally from 1000 to 10 000 g/l. Precursor compounds which undergo a chemical and/or morphological transformation, e.g. dewatering of a hydroxide to an oxide, during the heat treatment can also be dispersed in the cores.

The particles generally have a higher sintering temperature than the sinterable material, e.g. a sintering temperature which is at least 100 K higher.

In preferred embodiments, the particles are selected from among inorganic materials, e.g. a carbide such as silicon carbide or boron carbide; a nitride, silicon nitride, aluminum nitride, boron nitride or titanium nitride; silicide and/or aluminide.

Particularly preferred particles are oxides such as $Al_2O_3$ (in all modifications, in particular as α-alumina, boehmite, AlO(OH) or as aluminum hydroxide), $ZrO_2$, $Y_2O_3$, MgO, ZnO, CdO, $SiO_2$, $TiO_2$, $CeO_2$, $Fe_2O_3$, $Fe_3O_4$, $BaTiO_3$, CuO, NiO, CoO, $CO_3O_4$.

The particles can be, for example, particles which are usually used for producing glass (e.g. borosilicate glass, soda-lime glass or fused silica), glass-ceramic or ceramic (e.g. (glass-)ceramic based on the oxides $SiO_2$, BeO, $Al_2O_3$, $ZrO_2$ or MgO or the corresponding mixed oxides) or nonoxidic ceramics such as silicon nitride, silicon carbide, nitrides such as BN, AlN, $Si_3N_4$ and $Ti_3N_4$, or boron carbide. The particles can also be particles which are employed as fillers or pigments. Industrially important fillers are, for example, fillers based on $SiO_2$, e.g. quartz, cristobalite, tripolite, novaculite, kieselguhr, diatomaceous earth, fumed silicas, precipitated silicas and silica gels, silicates such as talc, pyrophyllite, kaolin, mica, muscovite, phlogopite, vermiculite, wollastonite and perlites, aluminum oxides and titanium dioxide.

Particularly preferred materials for the particles are $ZrO_2$, $Al_2O_3$, $TiO_2$ and $SiO_2$ or mixtures thereof.

In general, the average size of the dispersed particles is from 5 nm to 500 µm, in particular from 0.1 to 50 µm (measured using analytical ultracentrifuge or dynamic light scattering).

To achieve better dispersion of the particles in the gel-forming liquid, dispersants can optionally be concomitantly used.

In addition, a sublimable and/or pyrolyzable filler can be suspended in the gel-forming liquid. The filler is, for example, selected from among wood flour, cork flour, groundnut shells, cereal flour, cellulose powder and carbon black. The concomitant use of fillers offers the advantage that the porosity can be varied. The amount of filler is, for example, up to 30% by weight, in particular from 0.5 to 10% by weight, based on the total weight of the gel-forming liquid, the particles and the filler.

The gel cores are coated with a composition comprising a sinterable material and a binder. The coating of sinterable material and binder can be applied to the cores in various ways. For example, the sinterable material is mixed with the binder in the form of a suspension and the cores are coated with this suspension, for example in a mixer, fluidized-bed reactor or granulating pan. The cores are advantageously introduced into a fluidized-bed reactor. The dispersion of the sinterable material in the solution or dispersion of the binder is introduced into the fluidized bed. The temperature of the fluidizing gas is, for example, in the range from 70 to 120° C. Application of the layer and drying are generally complete within a period of from 5 to 60 minutes.

As an alternative, the cores can firstly be sprayed uniformly with the liquid binder and the sinterable material can then be dusted on and, if the desired layer thickness has not yet been reached by means of a single operation, this operation is repeated until the desired coating thickness has been obtained.

If necessary, the coated cores are subsequently dried.

Possible sinterable materials are metal powders and ceramic powders. Mixtures of metal powders or ceramic powders are also conceivable. The sinterable ceramics can comprise, for example, nitride, oxide and silicate ceramics and also carbides.

Examples of sinterable ceramic powders are oxidic ceramic powders such as $Al_2O_3$, $ZrO_2$, $Y_2O_3$, and also non-oxidic ceramic powders such as SiC or $Si_3N_4$.

The sinterable material is preferably a metal powder. As metals which are present in powder form, mention may be made of, for example, aluminum, iron, in particular iron carbonyl powder, cobalt, copper, nickel, silicon, titanium and tungsten. As pulverulent metal alloys, mention may be made of, for example, high alloy steels or low alloy steels and also metal alloys based on aluminum, iron, titanium, copper, nickel, cobalt or tungsten, e.g. bronze. It is possible to use either powders of finished alloys or powder mixtures of the individual constituents of the alloys. The metal powders, metal alloy powders and carbonyl metal powders can also be used in admixture.

As metal powder, preference is given to carbonyl iron powder. Carbonyl iron powder is an iron powder which is produced by thermal decomposition of iron carbonyl compounds. To achieve flowability and to prevent agglomeration, it can be coated with, for example, $SiO_2$. As corrosion inhibitor, preference is given to making concomitant use of iron phosphide powder.

The binder is generally present as solution or dispersion, preferably in an aqueous medium. As binders, it is possible to use many polymers. In particular, polymers or copolymers from the group consisting of vinyl ester polymers, e.g. polyvinyl acetate, copolymers of vinyl acetate-ethylene, vinyl acetate-ethylene-vinyl chloride, vinyl acetate-acrylic ester, vinyl acetate-di-n-butyl maleate, vinyl acetate-vinyl laurate, vinyl acetate-acrylate; partially hydrolyzed polyvinyl acetate, polyvinyl alcohol; polybutyral; polyamides such as polyvinylpyrrolidone; polyacrylates, copolymers of styrene-acrylate; cellulose esters; phenolic resins, amino resins, e.g. urea resins or melamine resins; and epoxide resins are used. Which binder is most suitable in view of the powder material selected and the pyrolysis and sintering conditions prescribed thereby can easily be determined by means of simple experiments. Polyvinyl alcohols and cellulose esters are particularly suitable.

The individual cores which have been coated in this way can be subjected as such to the heat treatment or coated cores can be joined by adhesion to one another before the heat treatment in order to obtain shaped bodies. The cores can, for example, be adhesively bonded to one another. Adhesive bonding can, for example, be carried out by moistening the coated cores with a solvent which partially dissolves the binder and then bringing the cores together in the desired arrangement. Self-supporting sound-damping structures which have a degree of mechanical strength and achieve load-bearing properties within certain limits can be provided in this way. For example, dividing walls, door elements or even floors of vehicles can be obtained in this form using hollow bodies produced according to the invention.

The gel and sublimable and/or pyrolyzable fillers which are optionally additionally used and the binder are driven off from the coating by means of a heat treatment. The sinterable material is sintered to give a closed shell. The term "driven off" is intended to comprise upstream decomposition and/or pyrolysis processes. The heat treatment can be carried out in a single-stage or multistage process. If attention is paid to the type and amount of binder and also a sufficient layer thickness, the dried layers of solid have sufficient strength for the coated cores to be able to be subjected to a pyrolytic decomposition process without the shell losing its shape. In the pyrolysis of the coated foam core, the binder also volatilizes from the layer of solid and leaves behind a self-supporting hollow sphere having a porous shell structure.

The pyrolysis of the coated foam particles can be carried out in air, inert gas or under reducing conditions, depending on the type of the powder used. The heating time to a temperature of about 500° C. is up to 3 hours and depends on the type and composition of the gel used. To increase the green strength, it can be advantageous in the case of metallic powders to pyrolyze under slightly oxidizing conditions. Better removal of residual carbon and a strength-increasing oxide skin on the surfaces of the metal powder particles are achieved in this way.

The pyrolytic treatment, which serves both to remove the coated gel core and also to effect at least partial removal of the organic binder, is followed by a sintering process. This sintering process at a temperature of from 900 to 1500° C. is carried out in a furnace, e.g. a rotary tube furnace, rabble furnace or belt furnace. The atmosphere in the furnace apparatus can be matched to the powder material used in each case for the coating. It can therefore be carried out under reduced pressure, under oxidizing or reducing conditions or under protective gas.

Sintering together of the individual hollow bodies can be prevented either by keeping the hollow bodies in motion or by means of an external coating with inert powder as long as this does not undergo any chemical or physical reactions with the hollow body material at the temperature employed. Such inert powders can easily be removed mechanically or chemically from the hollow bodies after the sintering process. They can also act as supporting shell for the actual hollow spheres during the pyrolysis and sintering processes, especially when the wall thickness of the hollow bodies is very thin or the actual hollow body powder layer after the pyrolysis does not yet have sufficient green strength. Suitable inert powders are, for example, carbon, aluminum hydroxide or chalk, depending on the hollow body material.

Individual hollow bodies can be shaped after the heat treatment if, for example, a strong bond between structural elements and a sound-absorbing lightweight component is desired. The hollow bodies can, as indicated above, form a sound-absorbing structure in the form of a loose bed. However, it is also possible to join hollow bodies to one another by adhesion after the thermal treatment, which can be achieved by adhesive bonding, soldering or sintering. Hollow bodies produced according to the invention can also be embedded within a matrix, which can be effected, for example, by means of a suitable curable polymer, e.g. an epoxy resin, or a relatively low-melting metal.

The invention is illustrated with the aid of the accompanying FIGURE and the following examples.

FIG. 1 shows an apparatus suitable for producing the cores used according to the invention.

According to FIG. 1, a crosslinking bath (B) is covered with a layer of a liquid phase (A) which is miscible neither with the crosslinking bath nor with the gel-forming liquid (C).

The liquid phase (A) is stirred by means of a motor-driven stirrer (Motor). Gel-forming liquid (C) is introduced dropwise into the liquid phase (A) by means of a pump (Pump) and droplets of the gel-forming liquid sink from the liquid phase (A) into the crosslinking bath (B).

EXAMPLE 1

A 1% strength aqueous $CaCl_2$ solution was introduced into an upright cylinder to a fill height of 20 cm and covered with a 15 cm layer of toluene. A dispersion of 100 g of aluminum oxide powder in a solution of 1 g of sodium alginate in 100 ml of water was introduced dropwise via a 1.8 mm nozzle into the prepared crosslinking bath at a rate of about 1 droplet per second. After the addition was complete, the spheres formed were taken out. The moist spheres had a diameter of 3.5-4.0 mm. The spheres were dried at 60° C. under reduced pressure in an oven. The dried spheres had a diameter of 2.8-3.4 mm.

The spheres produced in this way can, for example, be coated in a fluidized bed with a suspension of carbonyl iron powder in an aqueous solution of polyvinyl alcohol. The green spheres produced can subsequently be subjected to a heat treatment under a protective gas atmosphere at a maximum sintering temperature of 1120° C. Here, the organic components are driven off and the shells of the spheres are consolidated by sintering. In the spheres obtained, the aluminum oxide particles are present in freely mobile form in the dense shell of the sphere.

EXAMPLE 2

Example 1 was repeated with 10 g of wood flour being additionally dispersed in the gel-forming liquid. The moist spheres had a diameter of 3.2-3.6 mm. The dried spheres had a diameter of 2.9-3.1 mm.

The invention claimed is:

1. A process for producing hollow bodies having freely mobile particles enclosed in the hollow body, which comprises
 a) suspending particles in a gel-forming liquid and introducing the gel-forming liquid into a crosslinking bath, wherein
  a1) a layer of a liquid phase which is miscible neither with the crosslinking bath nor with the gel-forming liquid is placed on top of the crosslinking bath,
  a2) the gel-forming liquid with the particles dispersed therein is introduced into the liquid phase and
  a3) droplets of the gel-forming liquid are allowed to sink from the liquid phase into the crosslinking bath,
 b) isolating the gel cores which form,
 c) coating the cores with a composition comprising a sinterable material and a binder, wherein the sinterable material is a metal powder, and
 d) subjecting the coated cores to a heat treatment in which the gel and the binder are driven off and the sinterable material sinters to form a closed shell,
 wherein the particles are inorganic materials and wherein the particles comprise a carbide, nitride, oxide, silicide and/or aluminide.

2. The process according to claim 1, wherein the gel-forming liquid comprises an ionically crosslinking gel former.

3. The process according to claim 2, wherein the ionically crosslinking gel former is selected from the group consisting of alginates, carrageenans, chitosans and pectinates.

4. The process according to claim 2, wherein the ionically crosslinking gel former is sodium alginate and the crosslinking bath comprises calcium ions.

5. The process according to claim 1, wherein a sublimable and/or pyrolyzable filler is additionally suspended in the gel-forming liquid.

6. The process according to claim 1, wherein the gel-forming liquid comprises from 10 to 90% by weight of dispersed particles, based on the total weight of the gel-forming liquid and the particles.

7. The process according to claim 1, wherein the particles are $ZrO_2$, $Al_2O_3$, $TiO_2$ or $SiO_2$ or mixtures thereof.

8. The process according to claim 1, wherein the average size of the particles is from 5 nm to 500 µm.

9. The process according to claim 1, wherein the metal powder is carbonyl iron powder.

10. The process according to claim 1, wherein the cores are substantially spherical.

11. The process according to claim 1, wherein the cores have a diameter of from 0.1 to 20 mm.

* * * * *